US009784586B2

(12) United States Patent
Deittert

(10) Patent No.: US 9,784,586 B2
(45) Date of Patent: Oct. 10, 2017

(54) PATH PLANNING

(71) Applicant: BAE SYSTEMS plc, London (GB)

(72) Inventor: Markus Deittert, Bristol (GB)

(73) Assignee: BAE SYSTEMS plc, London (GB)

(*) Notice: Subject to any disclaimer, the term of this patent is extended or adjusted under 35 U.S.C. 154(b) by 0 days.

(21) Appl. No.: 14/905,194

(22) PCT Filed: Jul. 4, 2014

(86) PCT No.: PCT/GB2014/052037
§ 371 (c)(1),
(2) Date: Jan. 14, 2016

(87) PCT Pub. No.: WO2015/008029
PCT Pub. Date: Jan. 22, 2015

(65) Prior Publication Data
US 2016/0153791 A1  Jun. 2, 2016

(30) Foreign Application Priority Data

Jul. 15, 2013  (EP) ..................................... 13275165
Jul. 15, 2013  (GB) ..................................... 1312605.7

(51) Int. Cl.
G05D 1/00 (2006.01)
G01C 21/34 (2006.01)
(Continued)

(52) U.S. Cl.
CPC ........... *G01C 21/34* (2013.01); *B60W 30/146* (2013.01); *G01C 21/20* (2013.01); *G05D 1/0088* (2013.01); *G05D 1/0217* (2013.01); *G06Q 10/04* (2013.01)

(58) Field of Classification Search
CPC ..... G01C 21/34; G01C 21/20; B60W 30/146; G05D 1/0088; G05D 1/0217; G06Q 10/04
(Continued)

(56) References Cited

U.S. PATENT DOCUMENTS 6,477,515 B1 * 11/2002 Boroujerdi ............. G06Q 10/04
                                                          701/120
2005/0192749 A1  9/2005 Flann et al.
2005/0216181 A1  9/2005 Estkowski et al.

FOREIGN PATENT DOCUMENTS

WO        0040929 A1   7/2000
WO        0125725 A1   4/2001
(Continued)

OTHER PUBLICATIONS

International Preliminary Report on Patentability received for Patent Application No. PCT/GB2014/052037, mailed on Jan. 28, 2016. 7 pages.

(Continued)

Primary Examiner — Muhammad Shafi
(74) Attorney, Agent, or Firm — Finch & Maloney PLLC

(57) ABSTRACT

Disclosed are methods and apparatus for determining a path (4) for a vehicle (2). The method comprises providing starting and final positions for the vehicle (2), and using the provided positions, determining an ordered sequence of points, thereby providing the path (4) for the vehicle (2). Performing the optimisation process comprises: minimising a distance between the final position and a last point in the sequence; for each point other than a last point in the sequence, constraining a distance between that point and the next point to be equal to a predefined distance; and, for each path point other than the first and last points, constraining an angle between a line that connects that point to the point that (Continued)

precedes it and a line that connects that point to the next point to be greater than or equal to a predefined angle.

12 Claims, 3 Drawing Sheets

(51) Int. Cl.
  *G01C 21/20* (2006.01)
  *G06Q 10/04* (2012.01)
  *G05D 1/02* (2006.01)
  *B60W 30/14* (2006.01)

(58) Field of Classification Search
  USPC ............................................. 701/25, 26–49
  See application file for complete search history.

(56) References Cited

FOREIGN PATENT DOCUMENTS

WO 2013074034 A1 5/2013
WO 2015008029 A1 1/2015

OTHER PUBLICATIONS

International Search Report and Written Opinion received for Patent Application No. PCT/GB2014/052037, mailed on Aug. 22, 2014. 10 pages.

GB Intellectual Property Office Search Report under Section 17(5) received for GB Patent Application No. 1312605.7 mailed Jan. 3, 2014. 4 pages.

Extended European Search Report received for EP Patent Application No. 13275165.2 mailed Jan. 8, 2014. 4 pages.

Richards, A. and How, J.P., "Aircraft Trajectory Planning With Collision Avoidance Using Mixed Integer Linear Programming," published online on Sep. 6, 2006. URL: http://acl.mit.edu/papers/acc02_MILP.pdf. 8 pages.

Sharma, et al, "Trajectory Generation and Path Planning for Autonomous Aerobots," published online on May 27, 2010. URL: http://citeseerx.ist.psu.edu/viewdoc/download?doi=10.1.1.115.4970&rep=rep1&type=pdf. 6 pages.

* cited by examiner

PATH PLANNING

FIELD OF THE INVENTION

The present invention relates to path planning and apparatus for the planning of paths for vehicles.

BACKGROUND

Path planning methodologies, or trajectory planning methodologies, for example using Mixed Integer Linear Programming (MILP), are used to determine globally optimal trajectories for vehicles. Many path planning methodologies constrain vehicle trajectories with a linear approximation of the vehicle's dynamics.

Many vehicles (including, for example, cars, trucks, tracked vehicles, aircraft and boats) are subject to a minimum turning radius constraint. Such constraints tend to be difficult to include in a linear path planning problem, as such constraints are inherently nonlinear.

Many MILP processes implement additional constraints on the vehicle dynamics in order to produces a valid trajectory. However, such approaches tend to fail if an optimal solution contains velocities close to zero.

SUMMARY OF THE INVENTION

In a first aspect the present invention provides a method for determining a path for a vehicle. The method comprises: providing a starting position for the vehicle; providing a desired final position for the vehicle; and using the provided start position and desired final position, performing, by one or more processors, an optimisation process to determine a position for each path point in an ordered sequence of path points, thereby providing the path for the vehicle defined by the ordered sequence of path points. Performing the optimisation process comprises: minimising a distance between the desired final position for the vehicle and a last path point in the sequence of path points; for each path point other than a last path point in the sequence of path points, constraining a distance between that path point and the next path point in the ordered sequence to be equal to a predefined distance; and for each path point other than the first path point in the ordered sequence and the last path point in the ordered sequence, constraining an angle between a line that connects that path point to the path point that precedes that path point in the ordered sequence and a line that connects that path point to the next path point in the ordered sequence to be greater than or equal to a predefined angle.

The method may further comprise controlling, by a vehicle controller operatively coupled to the one or more processors, the vehicle such that the vehicle follows the determined path.

Performing the optimisation process may comprise: for each path point, projecting a vector between that path point and the next path point in the ordered sequence onto each of a plurality of base vectors, thereby providing a plurality of projections; and, for each path point, constraining the plurality of projections for that path point to be less than or equal to the predefined distance.

Performing the optimisation process may comprise: for each path point, projecting a vector between that path point and the next path point in the ordered sequence onto each of a plurality of base vectors, thereby providing a plurality of projections; and, for each path point, constraining one of the projections for that path point to be greater than or equal to some proportion of the predefined distance.

Performing the optimisation process may comprise, for each path point other than the first path point in the ordered sequence and the last path point in to ordered sequence, constraining a distance between that path point and a line that connects the path point that precedes that path point in the ordered sequence to the path point that follows that path point in the ordered sequence to be less than or equal to a further predefined distance.

The further predefined distance may be some function of an angle, the angle being dependent upon a minimum turning radius of the vehicle.

The further predefined distance may be some function of the predefined distance.

Performing the optimisation process may comprise constraining a position of the second path point in the ordered sequence to be dependent upon a position of the first path point in the ordered sequence and a vector that points in substantially the same direction as an initial velocity of the vehicle.

The vehicle may operable so as to be switched between operating in a forward gear and operating a reverse gear. The optimisation process may further comprises determining a switch profile for the vehicle, the switch profile specifying, for each path point, whether or not the vehicle is switched from operating in the forward gear to operating the reverse gear or vice versa.

The optimisation process may further comprise determining a velocity profile for the vehicle. The velocity profile may specify a velocity for the vehicle at each path point in the ordered sequence of path points.

Performing the optimisation process may comprise constraining a speed of the vehicle at the last path point in the ordered sequence to be less than or equal to a predefined threshold speed.

In a further aspect the present invention provides apparatus for determining a path for a vehicle. The apparatus comprises one or more processors configured to, using a starting position for the vehicle and a desired terminal position for the vehicle, perform an optimisation process to determine a position for each path point in an ordered sequence of path points, the ordered sequence of path points defining the path for the vehicle. Performing the optimisation process comprises: minimising a distance between the desired final position for the vehicle and a last path point in the sequence of path points; for each path point other than a last path point in the sequence of path points, constraining a distance between that path point and the next path point in the ordered sequence to be equal to a predefined distance; and, for each path point other than the first path point in the ordered sequence and the last path point in the ordered sequence, constraining an angle between a line that connects that path point to the path point that precedes that path point in the ordered sequence and a line that connects that path point to the next path point in the ordered sequence to be greater than or equal to a predefined angle.

The apparatus may further comprise a vehicle controller operatively coupled to the one or more processors and configured to control the vehicle such that the vehicle follows the determined path.

In a further aspect the present invention provides a program or plurality of programs arranged such that when executed by a computer system or one or more processors it/they cause the computer system or the one or more processors to operate in accordance with the method of any of the above aspects.

In a further aspect the present invention provides a machine readable storage medium storing a program or at least one of the plurality of programs according to the preceding aspect.

DETAILED DESCRIPTION

Figure 1:
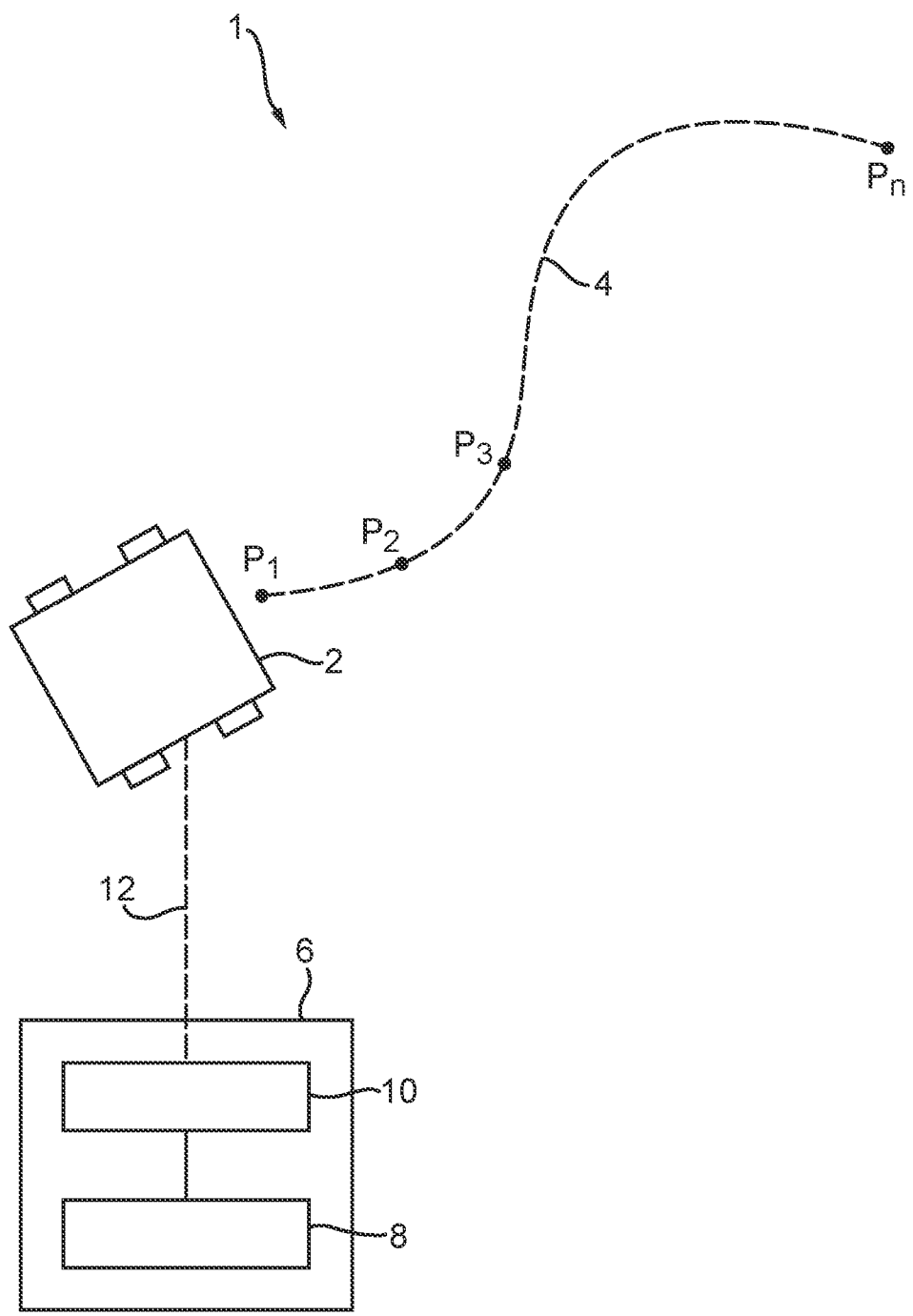
FIG. 1 is a schematic illustration (not to scale) showing a scenario in which an embodiment of a method of controlling a vehicle is implemented.

FIG. 1 is a schematic illustration (not to scale) showing a scenario 1 in which an embodiment of a method of controlling a vehicle 2 is implemented.

In this scenario 1, the vehicle 2 is a land-based, or ground-based, vehicle. In other words, the vehicle 2 is configured to travel along the ground. For example, the vehicle 2 is a wheeled or tracked vehicle.

In this scenario, the vehicle is controlled so that the vehicle 2 travels along a path 4 along the ground. The terminology "path" is used herein to refer to a route for the vehicle 2 from a first location on the ground to a second location on the ground.

The path 4 comprises an ordered sequence of points $P_1, P_2, P_3, \ldots, P_n$.

$P_1$ is the first point of the path 4.

$P_n$ is the final point of the path 4.

In this scenario 1, the vehicle 2 is controlled from a ground station 4.

In this scenario 1, the ground station 6 comprises a path planner 8 and a vehicle controller 10.

The path planner 8 is configured to determine the path 4 for the vehicle 2. The determination of the path 4 for the vehicle 2 is described in more detail later below.

The path planning module 8 is coupled to the vehicle controller 10 such that information (for example, information specifying the path 4) may be sent between the path planner 8 and the vehicle controller 10.

The vehicle controller 10 is configured to control the vehicle 2 such that the vehicle follows the path 4 determined by the path planner 8. The vehicle controller 10 controls the vehicle 2 by sending one or more control signals (i.e. instructions that are to be implemented by the vehicle 2) to the vehicle 2. A control signal is sent from the vehicle controller 10 to the vehicle 2 via the communications link 12.

In this embodiment, the communications link 12 is a wireless communications link.

Figure 2:
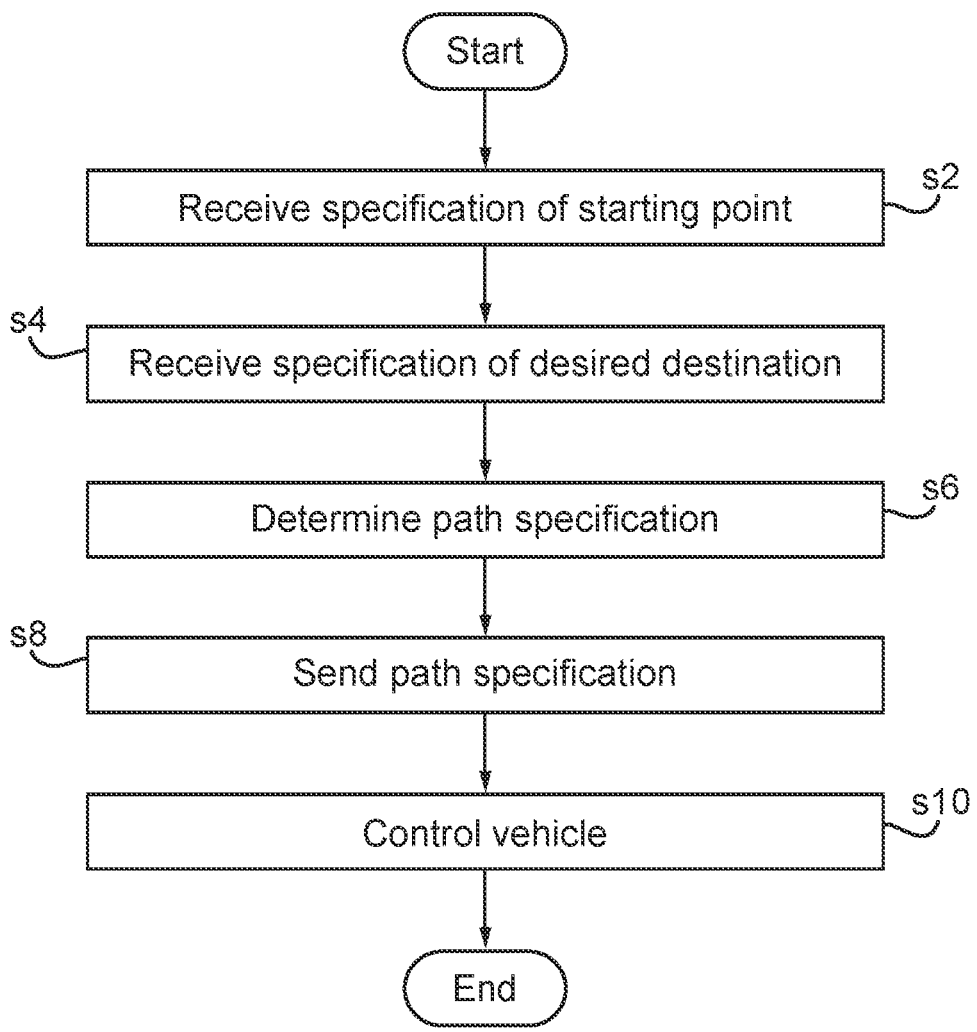
FIG. 2 is a process flow chart showing an embodiment of a method of controlling the vehicle.

FIG. 2 is a process flow chart showing an embodiment of a method of controlling the vehicle 2.

At step s2, the path planner 8 receives a specification of a starting point of the vehicle 2.

The starting point of the vehicle 2 is denoted herein as $P_{start}$.

In this embodiment, the starting point $P_{start}$ for the vehicle 2 may be specified in any appropriate manner. For example, a human user/operator of the vehicle 2 may identify the starting point $P_{start}$ for the vehicle 2, and input a specification for the identified starting point $P_{start}$ into the path planner 8. The terminology "identify" includes any appropriate form of identifying, selecting, choosing, establishing, acquiring etc.

At step s4, the path planner 8 receives a specification for a desired destination for the vehicle 2.

The destination for the vehicle 2 is denoted herein as $P_{end}$.

In this embodiment, the destination $P_{end}$ for the vehicle 2 may be specified in any appropriate manner. For example, a human user/operator of the vehicle 2 may identify the destination $P_{end}$ for the vehicle 2, and input a specification for the identified destination $P_{end}$ into the path planner 8.

At step s6, using the received starting point $P_{start}$ and destination $P_{end}$ for the vehicle 2, the path planner 8 determines a specification for the path 4 for the vehicle 2 to follow.

In this embodiment, the path 4 is a route from the first point of the path $P_1$ to the final point of the path $P_n$.

The path planning process performed by the path planner 8 at step s6 is described in more detail later below, after a description of steps s8 and s10.

At step s8, the path planner 8 sends information specifying the determined path 4 to the vehicle controller 10.

At step s10, using the received path specification, the vehicle controller 10 controls the vehicle 2 such that the vehicle 2 follows the path 4.

In this embodiment, the vehicle controller 10 controls the vehicle 2 by, using the received path specification, generating one or more control signals for the vehicle 2. The vehicle controller 10 then sends the generated control signal to the vehicle 2 via the communications link 12. The vehicle 2 receives the control signals from the vehicle controller 10 and implements actions specified by those control signals.

Thus, the vehicle 2 is controlled so that the vehicle moves along the path 4, from the first point of the path $P_1$ to the final point of the path $P_n$.

Thus, a method of controlling the vehicle 2 is provided.

Returning now to the path planning process performed by the path planner 8 at step s6, the following information is useful in understanding of the determination of the path specification.

A path P for the vehicle 2 may be specified by an ordered sequence of n points. In other words, a path P for the vehicle may be expressed as:

$$P = [P_1, P_2, P_3, \ldots, P_n]$$

where: P is the path for the vehicle; and

Pi is a point along the path P. $P_1$ is the first point of the path P. $P_n$ is the final point of the path P.

At step s6, the path planner 8 performs an optimisation process to determine an optimal sequence of points $P_1$ to $P_n$, thereby providing a specification for the path 4 that is to be followed by the vehicle 2.

In this embodiment, the optimisation process is constrained by a number of constraints, for example, one or more of the following constraints.

In this embodiment, a first constraint is that the distance between the desired destination $P_{end}$ for the vehicle 2 and the last point in the sequence $P_n$ is minimised, i.e.

$$\underset{P}{\text{minimise}}\, F = \|P_n - P_{end}\|$$

In this embodiment, a second constraint is that the spacing, i.e. the distance, between two consecutive path points is equal to a predefined distance value. The predefined distance value is denoted herein as $D_{max}$. This constraint is hereinafter referred to as the "spacing constraint".

The spacing constraint may be expressed as:

$$\forall t \in [2, \ldots, n]$$

$$\|P_t - P_{t-1}\| = D_{max} \qquad \text{Equation 1}$$

This expression for the spacing constraint given in Equation 1 is nonlinear and contains an equality.

In this embodiment, the spacing constraint (Equation 1) is solved by approximating the 2-norm with linear inequalities. In particular, in this embodiment, when approximating the norm of a difference vector between two path points, that difference vector is projected onto each base vector in a set of M base vectors.

Figure 3:
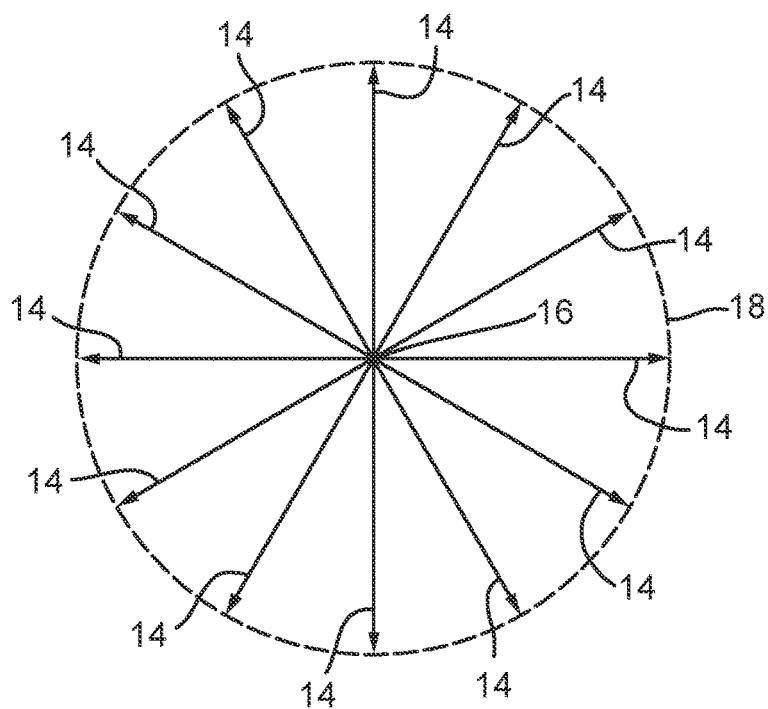
FIG. 3 is a schematic illustration (not to scale) showing a plurality of base vectors.

The M base vectors used in this embodiment are illustrated schematically in FIG. 3.

In this embodiment, the M base vectors 14 are radial vectors from a centre 16 of a circle to a circumference 18 of that circle. The centre 16 may be located at an origin (0, 0).

Also, in this embodiment, to implement the spacing constraint, the equality in Equation 1 is, in effect, replaced by two inequalities.

A first of the two inequalities constrains the maximum value of the spacing between two consecutive path points. This first inequality is hereinafter referred to as the "maximum spacing constraint". The maximum spacing constraint may be expressed as:

$$\forall m \in [1, \ldots, M], \forall t \in [2, \ldots, n-1] \qquad \text{Equation 2}$$

$$(P_{xt} - P_{xt-1})\cos\left(\frac{2\pi m}{M}\right) + (P_{yt} - P_{yt-1})\cos\left(\frac{2\pi m}{M}\right) \leq D_{max}$$

where: $P_{xi}$ is an x-coordinate (on the ground) of the path point $P_i$; and $P_{yi}$ is a y-coordinate (on the ground) of the path point $P_i$.

In effect, Equation 2 projects a difference vector between two path points onto each of the M base vectors 14. In this embodiment, if the result of each projection is less than $D_{max}$, the maximum spacing constraint (Equation 2) is satisfied.

A second of the two inequalities constrains the minimum value of the spacing between two consecutive path points. This first inequality is hereinafter referred to as the "minimum spacing constraint". The minimum spacing constraint may be expressed as:

$$\forall m \in [1, \ldots, M], \forall t \in [2, \ldots, n-1] \qquad \text{Equation 3}$$

$$(P_{xt} - P_{xt-1})\cos\left(\frac{2\pi m}{M}\right) + (P_{yt} - P_{yt-1})\cos\left(\frac{2\pi m}{M}\right) \geq$$
$$cD_{max}(1 - 3b_{t,m})$$

$$\sum_{m=1}^{M} b_{t,m} \leq M - 1$$

where: c is a constant that is close to, but less than, 1. (In this embodiment, c is a value between 0.9 and 0.95. Larger values of c may to lead to numerical solver convergence problems. Smaller values of c tend to produce errors in curvature constraint approximation. Nevertheless, in other embodiments, different values for c may be used); and b is a binary decision variable. (In this embodiment, b is a matrix with n rows and M columns. In this embodiment, the binary decision variable b provides that, during the optimisation process, one of the M constraints is selected to be satisfied, while the other M-1 constraints are ignored.

The spacing constraint given by Equations 2 and 3 advantageously constrains the spacing between consecutive plan points.

In this embodiment, a third constraint is a constraint on the position of the middle point of any three consecutive plan points. This constraint is hereinafter referred to as the "path curvature constraint". The path curvature constraint advantageously tends to provide that a vehicle with a minimum turn radius is able to follow the determined path.

Figure 4:
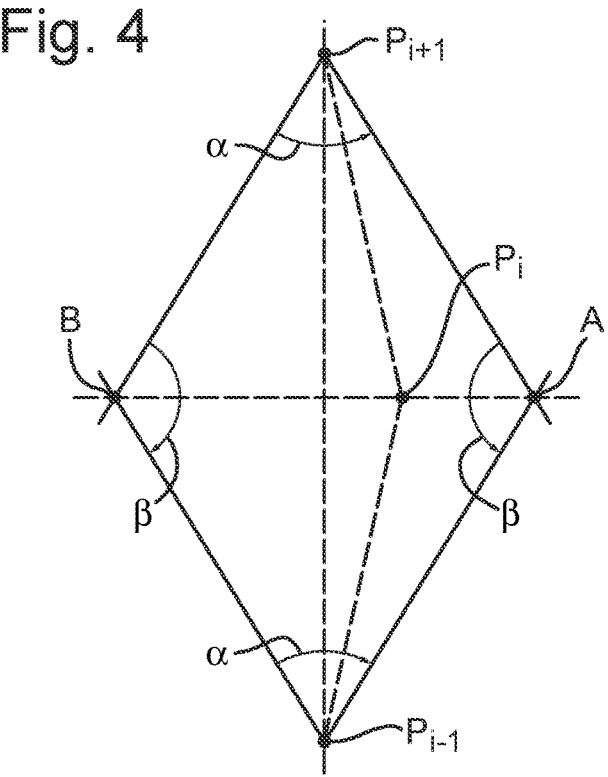
FIG. 4 is a schematic illustration (not to scale) illustrating constraints on a curvature of a path for the vehicle.

In this embodiment, as illustrated in FIG. 4, the curvature of a path is constrained by requiring that, for a consecutive sequence of points $P_{j-1}$, $P_j$, $P_{j+1}$, the middle point $P_j$ is located within the rhombus defined by the points $P_{j-1}$, A, $P_{j+1}$, and B. In this embodiment, the angle between the line from $P_{j-1}$ to A and the line from $P_{j-1}$ to B is $\alpha$. Similarly, the angle between the line from $P_{j+1}$ to A and the line from $P_{j+1}$ to B is $\alpha$. In this embodiment, the angle between the line from A to $P_{j-1}$ and the line from A to $P_{j+1}$ is $\beta$. Similarly, the angle between the line from B to $P_{j-1}$ and the line from B to $P_{j+1}$ is $\beta$.

In this embodiment, as the spacing between consecutive path points is equal to $D_{max}$, $P_i$ is equidistant between $P_{i-1}$ and $P_{i+1}$.

Thus, in this embodiment, the angle at $P_j$ (i.e. the angle between the line from $P_{i-1}$ to $P_i$ and the line from $P_i$ to $P_{i+1}$) is greater than or equal to $\beta$. The value of $\beta$ is dependent on the value of $\alpha$ and the point spacing $D_{max}$. In this embodiment, the value of $\alpha$ is a predetermined value that is depends on the turning radius, or turning circle, of the vehicle 2. The terminology "turning radius" is used herein to refer to the radius of the smallest circular turn that a vehicle is capable of performing. In this embodiment, vehicles that have a relatively small turning radius correspond to relatively large values of $\alpha$, while vehicles that have a relatively large turning radius correspond to relatively small values of $\alpha$.

The path curvature constraint may be expressed as follows:

$$\forall j \in [2, \ldots, n-1] \qquad \text{Equation 4}$$

$$\left\|\frac{\overline{P_{j-1}P_{j+1}}}{2} - \overline{P_{j-1}P_j}\right\| \leq D_{max}\sin\left(\frac{\alpha}{2}\right)$$

where: $\overline{P_k P_l}$ is a line between $P_k$ and $P_l$; and $\alpha$ is a predetermined value that is depends on the turning radius, of the vehicle 2.

In this embodiment, the path curvature constraint (Equation 4) is implemented by the path planner 8 by approximating Equation 4 using the same technique that was used to approximate Equation 3 which is described in more detail earlier above, i.e.

$$\forall j \in [2, \ldots, n-1]$$

$$a = \frac{\overline{P_{j-1}P_{j+1}}}{2} - \overline{P_{j-1}P_j}$$

$$b = D_{max}\sin\left(\frac{\alpha}{2}\right)$$

then $$\forall m \in [1, \ldots, M]$$

$$a\cos\left(\frac{2\pi m}{M}\right) + a\sin\left(\frac{2\pi m}{M}\right) \leq b$$

In this embodiment, a fourth constraint is that the sequence of points starts at the starting point $P_{start}$ of the vehicle 2, i.e. $P_1 = P_{start}$.

In this embodiment, a fifth constraint is a constraint on the second point $P_2$ in the sequence of path points. In this embodiment, the second path point $P_2$ is constrained by:

$$P_2 = P_1 + D_{max} e_{v_i}$$

where: $v_i$ is the vehicle's initial velocity vector; and
$e_{v_i}$ is a unit vector with the same direction as vi.

This fifth constraint advantageously tends to provide that the vehicle 2 is required to travel, to some extent, in the direction that it is facing before turning.

In the above embodiments, the optimisation process performed by the path planner at step s6 of the process of FIG. 2 comprises implementing the five constraints described above. However, in other embodiments, one or more of these five constraints may be omitted, or may be replaced by a different constraint that results in the same effect or advantage. Also, in other embodiments, one or more of the above described constraints may be implemented in a different way to that described above. Also, in other embodiments one or more further constraints may be implemented instead of or in addition one or more of the above described constraints.

For example, in some embodiments, a constraint that allows for a reversing capability of the vehicle to be implemented is used. Many land-based vehicles are able to reverse their motion, e.g. by switching from operating in a forward gear to operating in a reverse gear and then moving backwards. Such a reversing capability tends to allow a vehicle to change heading in a relatively small space compared to if the vehicle was only capable of forward motion. For example, a vehicle having a reversing capability may perform a three-point turn.

An example constraint that tends to allow for a reversing capability of the vehicle to be implemented may be expressed as:

$$\forall j \in [2, \ldots, n-1] \quad \text{Equation 5}$$

$$\left\| \frac{\overline{P_{j-1}P_{j+1}}}{2} - \overline{P_{j-1}P_j} \right\| \leq D_{max}\sin\left(\frac{\alpha}{2}\right) + p_j C$$

where: $\overline{P_k P_l}$ is a line between $P_k$ and $P_l$;
$\alpha$ is a predetermined value that is depends on the turning radius, of the vehicle 2;
$p = [p_1, p_2, \ldots, p_n]$ is a binary decision vector with n entries. If the $i^{th}$ entry of p (i.e. $p_i$) is positive, at the $i^{th}$ point in the path, the vehicle switches from being in a forward gear to being in a reverse gear or vice versa. If pi is zero, at the $i^{th}$ point in the path, the vehicle does not switches from being in a forward gear to being in a reverse gear or vice versa (i.e. if the vehicle is currently operating in a forward gear, the vehicle remains operating in a forwards gear, and similarly, if the vehicle is currently operating in a reverse gear, the vehicle remains operating in a reverse gear); and
C is a number that is larger than any possible value of the left-hand side of Equation 5. Hence, for $p_j=1$, Equation 5 is guaranteed to be satisfied.

In Equation 5, the vector p, in effect, specifies at which path points the vehicle switches from moving in a forward direction to moving in a reverse direction. Also, the vector p changes the path curvature constraints at each instance that the vehicle switches from moving in a forward direction to moving in a reverse direction.

In this embodiment, the optimisation process performed by the path planner 8 comprises determining the vector p. In other words, p is a variable of the optimisation. The value the vector p is determined when the optimisation problem is solved.

A further example constraint that tends to allow for a reversing capability of the vehicle to be implemented may be expressed as:

$$\forall j \in [2, \ldots, n-1] \quad \text{Equation 6}$$

$$\left\| \overline{P_{j-1}P_{j+1}} - \overline{P_{j-1}P_j} \right\| \leq D_{max}\sin(\gamma) + (1 - p_j)C$$

where: $\gamma$ is an angular constant. This angular constant specifies an amount of heading change that may occur at a point where the vehicle switches from moving in a forward direction to moving in a reverse direction (or vice versa). A value of $\gamma$ is dependent upon movement capabilities of the vehicle. A value of $\gamma$ may, for example, be determined for the vehicle based on characteristics of the vehicle or from experimentation. For example, a value of $\gamma$ may be between 10° and 20°.

The constraint expressed by Equation 6 advantageously ensures that, for a path in which a vehicle switches from moving in a forward direction to moving in a reverse direction (or vice versa) at path point $P_i$, the angle between $\overline{P_{i-1}P_i}$ and $\overline{P_i P_{i+1}}$ is an acute angle. This tends to provide that the determined path is appropriate for a vehicle.

In some embodiments, a constraint that the vehicle comes to a complete stop (i.e. has zero velocity) before the vehicle switches from moving in a forward direction to moving in a reverse direction (or vice versa) is implemented. Such a constraint may advantageously ensure that a heading reversal is only implemented if the vehicle slows down to a predetermined speed, or stops, before-hand. In other embodiments, a constraint that the vehicle's velocity is below a predefined threshold value before the vehicle switches from moving in a forward direction to moving in a reverse direction (or vice versa) is implemented.

In some embodiments, the optimisation process may be performed to determine a velocity profile for the vehicle as it travels along the path. In such embodiments, vehicle velocity constraints may be incorporated into the optimisation problem so that an appropriate velocity profile is determined for the vehicle.

In some embodiments, a nominal velocity value for the vehicle may be associated with each path point, and a change in velocity between consecutive path points may be constrained by an acceleration limit of the vehicle. Two consecutive velocities (e.g. a velocity of the vehicle between one pair of path points, and a velocity of the vehicle between the next pair of path points) may, for example, be expressed as:

$$v_i^2 = v_{i-1}^2 \pm 2aD_{max}$$

where: $v_i(t)$ is an instantaneous velocity of the vehicle at the $i^{th}$ path point;
a is the acceleration of the vehicle; and
$D_{max}$ be the spacing between two consecutive path points.

In some embodiment, one or more of the following velocity constraints are used in the performance of the optimisation process.

A first velocity constraint is a constraint on the vector $U = [u_1, u_2, \ldots, u_n]$, where $u_i(t) = v_i^2(t)$ for the path points $i = 1, \ldots, n$. The first velocity constraint may be expressed as follows:

$$\forall i \in [2, \ldots, n]$$

$$u_i \leq u_{i-1} + 2a_{max}D_{max}$$

$$-u_i \leq u_{i-1} + 2a_{max}D_{max}$$

where: $a_{max}$ is the maximum acceleration of the vehicle.

A second velocity constraint is a constraint that the velocity profile of the vehicle is zero or positive. The second velocity constraint may be expressed as:

$$\forall i \in [1, \ldots, n]$$

$$u_i \geq 0$$

A third velocity constraint is a constraint that the velocity of the vehicle is constrained by a maximum velocity constant. The third velocity constraint may be expressed as:

$$\forall i \in [1, \ldots, n]$$

$$u_i \leq 0.05^2 + (1-p_i)v_{max}^2 \qquad \text{Equation 7}$$

where: $v_{max}$ is the maximum velocity of the vehicle.

This third velocity constraint advantageously ensures that the vehicle's velocity is less than $v_{max}$ for each path point i where $p_i=0$. Also, the third velocity constraint advantageously ensures that the vehicle's velocity is less than a very small number for each path point i where $p_i$ is positive. In some embodiment, a different suitable value is used in Equation 7 instead of 0.05 such as 0.

A fourth velocity constraint is a constraint that the first velocity entry in U (i.e. $u_i$) is constrained by the vehicle's initial velocity. The fourth velocity constraint may be expressed as:

$$u_1 = v_1^2$$

A fifth velocity constraint is a constraint that the last velocity entries in U (i.e. $u_n$) is constrained by a safety requirement that vehicle comes to a stop at the end of the path. The fifth velocity constraint may be expressed as:

$$u_n = 0$$

In other embodiments, the fifth velocity constraint is a constraint that the last velocity entries in U (i.e. $u_n$) is constrained by a safety requirement that vehicle has a speed below a predefined threshold value at the end of the path.

In some embodiments, a value function F may be amended by a small velocity term. This advantageously tends to provide that the vehicle's speed is kept high. This process may be expressed as:

$$\underset{P,U}{\text{minimise}} \; F = \|P_n - P_e\| + 0.001 \sum U \qquad \text{Equation 8}$$

In some embodiment, a different suitable value is used in Equation 8 instead of 0.001.

In some embodiments, a constraint that the vehicle cannot travel through a maximum curvature turn at its top speed is used. Such constraints advantageously may be used to determine paths for vehicles that have a turning radius that varies with the speed of that vehicle (e.g. aircraft).

In some embodiments, for a vehicle moving on a circular path of radius R, the lateral acceleration $a_{lat}$ of that vehicle is related to the speed v of that vehicle as follows:

$$a_{lat} = \frac{v^2}{R}$$

Equivalently, for a vehicle moving on a path of curvature k, the lateral acceleration $a_{lat}$ of that vehicle is related to the speed v of that vehicle as follows:

$$a_{lat} = v^2 k$$

In some embodiments, a sixth velocity constraint is used. The sixth velocity constraint may be expressed as:

$$v^2 \leq \frac{a_{latmax}}{\kappa}$$

where $a_{lat_{max}}$ is the maximum lateral acceleration of the vehicle.

In some embodiments, for a triangle formed by three consecutive path points $P_{i-1}$, $P_i$, and $P_{i+1}$, the altitude of the triangle $h_i$ may be defined as the distance from the line $\overline{P_{i-1}P_{i+1}}$ to the point $P_i$, i.e.

$$h_i = \left\| \frac{\overline{P_{i-1}P_{i+1}}}{2} - \overline{P_{i-1}P_i} \right\|$$

Also, a path's curvature at the $i^{th}$ path point $k_i$ may be related to the maximum plan point spacing, $D_{max}$ and $h_i$ by:

$$\kappa_i = \frac{h_i}{D_{max}^2}$$

Thus, in some embodiments, a seventh velocity constraint is used. The seventh velocity constraint may be expressed as:

$$\forall i \in [2, \ldots, n] \qquad \text{Equation 9}$$

$$u_i \leq \frac{a_{latmax} D_{max}}{h_i}$$

The seventh velocity constraint as expressed in Equation 9 is nonlinear. To implement the seventh velocity constraint, a binary decision variable may be used.

This binary decision variable may be binary decision matrix B. In some embodiments there are n points along the path. Also, Equation 9 may be approximated with $n_s$ linear constraints. In such embodiments, the matrix B may be an $n \times n_s$ binary matrix. In some embodiments, an element $b_{ij}$ in B being equal to 1 may indicate that the $j^{th}$ constraint is ignored at the $i^{th}$ path point $P_i$.

The $i^{th}$ linear constraint may be characterised by its slope $m_i$ and y-axis intercept $y_i$. Thus, the seventh velocity constraint (Equation 9) may be approximated as:

$$\forall i \in [2, \ldots, n], j \in [1, \ldots, n_S]$$

$$u_i \leq m_j h_i + y_j + C b_{ij}$$

$$\sum_{k=1}^{n_S} b_{ik} \leq n_S - 1$$

where C is a large number, i.e. any number that is large enough to ensure that when $b_{ij}$ is positive, the equation $u_i \leq m_j h_i + y_j + C b_{ij}$ is satisfied.

An advantage provided by the above described path planning processes is that paths for a vehicle that has a minimum turning radius may be planned, and the vehicle may be controlled so as to follow that path. In other words, the above described constraints applied to the path planner advantageously tend to provide that the determined trajectory is able to be followed by a vehicle (e.g. a wheeled land vehicle) that has a curvature limit.

A further advantage provided by the above described methods is that the performance of the path planner and/or the vehicle, in particular when the vehicle travels at relatively low speeds, tends to be improved compared to a conventional approach. Performance may, for example, be measured as the error between the turn radii within the optimal linear path and the turn radius of the vehicle.

A further advantage provided by the above described path planning process is that non-linear vehicle dynamic constraints may be accounted for. In particular, non-linear vehicle dynamic constraints may be accounted for using a linear programming based path planning process.

Conventional Mixed Integer Linear Programming (MILP) techniques tend to be usable for single velocities only. Moreover, conventional MILP techniques tend to fail if the optimal solution contains vehicle velocities close to zero. The above described methods advantageously tend to overcome these problems.

In the above described method, the path planning problem is advantageously formulated as a spatial problem only, i.e. a resultant path only contains vehicle positions as opposed to including nominal vehicle velocities. Thus, the resultant path can be executed at an arbitrary vehicle speed. Thus, failure modes of the above described method tend to be independent of a vehicle's speed.

A method for performing path planning for nonholonomic vehicles using Mixed Integer Linear Programming (MILP) is advantageously provided. The method advantageously separates a spatial path for the vehicle and a speed profile of the vehicle.

Advantageously, using some of the above described constraints, paths that involve a vehicle heading reversal (e.g. the vehicle switching from moving in a forward direction to moving in a reverse direction or vice versa) may be produced for vehicle capable of performing such a heading reversal.

Apparatus, including the path planner, for implementing the above arrangement, and performing any of the above described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIG. 2 and described above may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

In some embodiments, different sets of constraints may be implemented by a path planner contemporaneously or in series. How the constraints are implemented, i.e. in what order and for what proportion of the vehicle's path, may advantageously be selected depending on the application. For example, in some embodiments two sets of constraints may be applied at different times, e.g. one set of constraints may be used for a first part of the path, and a different set of constraints may be used in a second part of the path.

In the above embodiments, the vehicle is a land-based vehicle, e.g. a vehicle comprises wheels and/or tracks. However, in other embodiments the vehicle may be a different type of vehicle e.g. an aircraft or water-based vehicle. Also, the vehicle may be a manned or unmanned vehicle.

In the above embodiments, the path planner and the vehicle controller are located remotely from vehicle, at a ground station. However, in other embodiments, one or both of the path planner and the vehicle controller are located at a different location. For example, in some embodiments, one or both of the path planner and the vehicle controller are located onboard the vehicle.

In the above embodiment, the path planning and vehicle control process is implemented to determine a path for, and control, a single vehicle. However, in other embodiments, the path planning and vehicle control process is implemented to determine a path for, and control, a plurality of vehicles.

In the above embodiments, the constraints that are implemented by the path planner are expressed by the relevant above described equations. In other embodiments, one or more of the constraints may be implemented using a different appropriate equation so as to provide an equivalent constraining effect on the path planner, and/or provide the equivalent functionality to that described above.

In the above embodiments, the path planning process is implemented to determine a 2-dimensional path. However, in other embodiments, the path planning process is implemented to determine a different type of path, for example a 3-dimensional path.

The invention claimed is:

1. An apparatus for determining a path for a vehicle, the apparatus comprising:
one or more processors configured, using a starting position for the vehicle and a desired terminal position for the vehicle, to perform an optimisation process to determine a position for each path point in an ordered sequence of path points (P1-Pn), the ordered sequence of path points (P1-Pn) defining the path for the vehicle;
wherein performing the optimisation process comprises:
minimising a distance between the desired final position for the vehicle and a last path point ($P_n$) in the sequence of path points ($P_1$-$P_n$);
for each path point other than a last path point (Pn) in the sequence of path points (P1-Pn), constraining a distance between that path point and the next path point in the ordered sequence ($P_1$-$P_n$) to be equal to a predefined distance; and
for each path point other than the first path point ($P_1$) in the ordered sequence ($P_1$-$P_n$) and the last path point ($P_n$) in the ordered sequence ($P_1$-$P_n$), constraining an angle between a line that connects that path point to the path point that precedes that path point in the ordered sequence ($P_1$-$P_n$) and a line that connects that path point to the next path point in the ordered sequence ($P_1$-$P_n$) to be greater than or equal to a predefined angle.

2. The apparatus according to claim 1, wherein the apparatus further comprises a vehicle controller operatively coupled to the one or more processors and configured to control the vehicle such that the vehicle follows the determined path.

3. The apparatus according to claim 1, wherein performing the optimisation process further comprises controlling, by a vehicle controller operatively coupled to the one or more processors, the vehicle such that the vehicle follows the determined path.

4. The apparatus according to claim 1, wherein performing the optimisation process further comprises:
for each path point, projecting a vector between that path point and the next path point in the ordered sequence ($P_1$-$P_n$) onto each of a plurality of base vectors, thereby providing a plurality of projections; and
for each path point, constraining the plurality of projections for that path point to be less than or equal to the predefined distance.

5. The apparatus according to claim 1, wherein performing the optimisation process further comprises:
for each path point, projecting a vector between that path point and the next path point in the ordered sequence ($P_1$-$P_n$) onto each of a plurality of base vectors, thereby providing a plurality of projections; and
for each path point, constraining one of the projections for that path point to be greater than or equal to some proportion of the predefined distance.

6. The apparatus according to claim 1, wherein performing the optimisation process further comprises, for each path point other than the first path point ($P_1$) in the ordered sequence ($P_1$-$P_n$) and the last path point ($P_n$) in the ordered sequence ($P_1$-$P_n$), constraining a distance between that path point and a line that connects the path point that precedes that path point in the ordered sequence ($P_1$-$P_n$) to the path point that follows that path point in the ordered sequence ($P_1$-$P_n$) to be less than or equal to a further predefined distance.

7. The apparatus according to claim 6, wherein the further predefined distance is some function of an angle, the angle being dependent upon a minimum turning radius of the vehicle.

8. The apparatus according to claim 6, wherein the further predefined distance is some function of the predefined distance.

9. The apparatus according to claim 1, wherein performing the optimisation process further comprises constraining a position of the second path point in the ordered sequence ($P_1$-$P_n$) to be dependent upon a position of the first path point ($P_1$) in the ordered sequence and a vector that points in substantially the same direction as an initial velocity of the vehicle.

10. The apparatus according to claim 1, wherein the vehicle is operable so as to be switched between operating in a forward gear and a reverse gear; and performing the optimisation process further comprises determining a switch profile for the vehicle, the switch profile specifying, for each path point, whether or not the vehicle is switched between operating in the forward gear and the reverse gear.

11. The apparatus according to claim 1, wherein performing the optimisation process further comprises determining a velocity profile for the vehicle, the velocity profile specifying a velocity for the vehicle at each path point in the ordered sequence of path points ($P_1$-$P_n$).

12. The apparatus according to claim 11, wherein performing the optimisation process further comprises constraining a speed of the vehicle at the last path point ($P_n$) in the ordered sequence ($P_1$-$P_n$) to be less than or equal to a predefined threshold speed.

* * * * *